(12) United States Patent
Schrüfer

(10) Patent No.: US 7,618,190 B2
(45) Date of Patent: Nov. 17, 2009

(54) SLIDE BEARING SHELL

(75) Inventor: Norbert Schrüfer, Laakirchen (AT)

(73) Assignee: Miba Gleitlager GmbH, Laakirchen (AT)

( * ) Notice: Subject to any disclaimer, the term of this patent is extended or adjusted under 35 U.S.C. 154(b) by 737 days.

(21) Appl. No.: 10/525,650

(22) PCT Filed: Aug. 26, 2003

(86) PCT No.: PCT/AT03/00245

§ 371 (c)(1),
(2), (4) Date: Feb. 24, 2005

(87) PCT Pub. No.: WO2004/020853

PCT Pub. Date: Mar. 11, 2004

(65) Prior Publication Data

US 2005/0244087 A1 Nov. 3, 2005

(30) Foreign Application Priority Data

Aug. 27, 2002 (AT) .............. A 1277/2002

(51) Int. Cl.
*F16C 33/02* (2006.01)
*F16C 9/02* (2006.01)
*F16C 33/10* (2006.01)

(52) U.S. Cl. .................. 384/295; 384/294; 384/288

(58) Field of Classification Search ........... 384/294, 384/295, 296, 288, 429, 430, 432, 433, 434; 29/898.042, 898.045, 898.054, 898.057
See application file for complete search history.

(56) References Cited

U.S. PATENT DOCUMENTS

| 3,251,119 | A | * | 5/1966 | Kingsbury et. al. ..... 29/898.058 |
| 4,775,249 | A | | 10/1988 | Roemer et al. |
| 4,872,248 | A | | 10/1989 | Roemer et al. |
| 5,463,811 | A | | 11/1995 | Aureli et al. |
| 6,227,709 | B1 | | 5/2001 | Lehmann et al. |
| 2005/0276529 | A1 | * | 12/2005 | Caspers et al. .............. 384/294 |

FOREIGN PATENT DOCUMENTS

| DE | 29 43 711 A | 5/1981 |
| DE | 32 30 700 C2 | 3/1984 |
| DE | 36 18 742 A | 12/1987 |
| DE | 196 31 663 C2 | 2/1988 |

OTHER PUBLICATIONS

International Search Report.

* cited by examiner

*Primary Examiner*—Thomas R Hannon
*Assistant Examiner*—Justin Krause
(74) *Attorney, Agent, or Firm*—Collard & Roe, P.C.

(57) ABSTRACT

A sliding bearing shell is described, comprising at least one holding cam (4) which is provided in the region of the dividing surface (2), projects beyond the back (3) of the shell and forms a deformation section of the sliding bearing shell (1) which extends over only a part of the thickness of the shell. In order to provide advantageous constructional conditions it is proposed that the deformation section consists of a tongue (5) which is cut out and bent out partly from the sliding bearing shell (1) through an indentation (6) starting from the dividing surface (2).

1 Claim, 2 Drawing Sheets

SLIDE BEARING SHELL

CROSS REFERENCE TO RELATED APPLICATIONS

Applicant claims priority under 35 U.S.C. §119 of Austrian Application No. A 1277/2002 filed on Aug. 27, 2002. Applicant also claims priority under 35 U.S.C. §365 of PCT/AT2003/000245 filed on Aug. 26, 2003. The international application under PCT article 21(2) was not published in English.

FIELD OF THE INVENTION

The invention relates to a sliding bearing shell with at least one holding cam which is provided in the region of the dividing surface, projects beyond the back of the shell and forms a deformation section of the sliding bearing shell which extends over only a part of the thickness of the shell.

DESCRIPTION OF THE PRIOR ART

In order to enable sliding bearing shells to be positioned easily in respective bearing housings, sliding bearing shells are provided in the region of their dividing surface with at least one holding cam which projects beyond the back of the shell and engages in a recess in the bearing housing which is adjusted in its shape to the holding cam. For forming such holding cams it is known (DE 3 230 700 C2) to upset the dividing surface of the sliding bearing shell in a radially outer and axially delimited section in such a way that the shell material is displaced in a plastic way radially to the outside. This deformation section of the sliding bearing shell extending over only a part of the shell thickness forms a holding cam with the advantage that the bearing surface of the sliding bearing shells is not impaired by the formation of the holding cam. The disadvantage is however that for forming sufficiently dimensioned holding cams it is necessary to displace a respectively large volume of material, which causes increasing difficulties with decreasing thickness of the sliding bearing shells. For this reason, the shell walls in thin-walled sliding bearing shells are bulged in their entirety in the region of the holding cams to be provided (DE 196 31 663 C2), which leads to the disadvantage that in the region of the bulged deformation section the supporting bearing surface region is interrupted.

SUMMARY OF THE INVENTION

The invention is thus based on the object of providing a sliding bearing shell of the kind mentioned above in such a way that the formation of sufficiently dimensioned holding cams can be ensured with simple means even in the case of thin-walled sliding bearing shells.

This object is achieved by the invention in such a way that the deformation section consists of a tongue which is cut out and bent out from the sliding bearing shell through an indentation starting from the dividing surface.

Since as a result of these measures the deformation section of the sliding bearing shell which forms the holding cam consists of a tongue which is partly cut out and bent out from the sliding bearing shell by an indentation which is perpendicular to the dividing surface and is aligned in an axial way relative to the sliding bearing shell, the radial projecting end of the holding cam over the shell back depends on the one hand on the length of the tongue and thus on the depth of the indentation and on the other hand on the bend-off angle, but not on the material displacement, so that even in the case of comparatively thin sliding bearing shells it is possible to provide holding cams projecting sufficiently over the shell back without impairing the bearing surface in the region of the holding cams. An additional aspect is that due to the indentation of the sliding bearing shell the forces required for making the deformation section can be kept at a comparatively low level in comparison with other required upsetting forces. Moreover, the hardening of the material due to cold deformation remains limited, so that the likelihood of the formation of cracks especially in the region of the root of the tongue (i.e. in the transitional region from tongue to shell back) remains low, so that the formation of the deformation section in accordance with the invention as a partly cut-out tongue will impair the strength properties of the sliding bearing shell in the region of the holding cam only to a comparatively low extent.

For producing such sliding bearing shells with a holding cam made of a tongue which is bent out from the shell wall, the tongue can be cut out in a progressive manner with the help of a cleaving tool by an indentation of the sliding bearing shell starting from the dividing surface and can be bent out from the sliding bearing shell, so that merely one pass is required for producing the holding cam. The wedge shape of the cleaving tool determines the amount of the tongue bending depending on the indentation depth and thus the shape of the holding cam.

To ensure that the indentation for partly cutting out the tongue produces a deformation of the sliding bearing shell merely in the tongue region but not in the adjacent regions it is necessary that the sliding bearing shell is clamped in the usual manner both in the region of the running surface as well as in the region of the back of the bearing. The support in the region of the back of the shell is only interrupted in the tongue region, so that the tongue is bent out when the wedge-like cleaving tool penetrates the recess as provided for in the tongue region. The recess edges resting on the shell back of the respectively provided receiving means for the subject can be configured as bed knives cooperating with the cleaving tool, so that the regions of the lateral face surfaces of the tongue which project beyond the shell back in the course of the progressive cutting and bending of the tongue by said bed knives in order to ensure a precise extension of the holding cam concerning the shell axis without an additional work step.

BRIEF DESCRIPTION OF THE DRAWINGS

The subject matter of the invention is shown by way of examples in the drawings, wherein.

DESCRIPTION OF THE PREFERRED EMBODIMENT

Figures 1, 2:
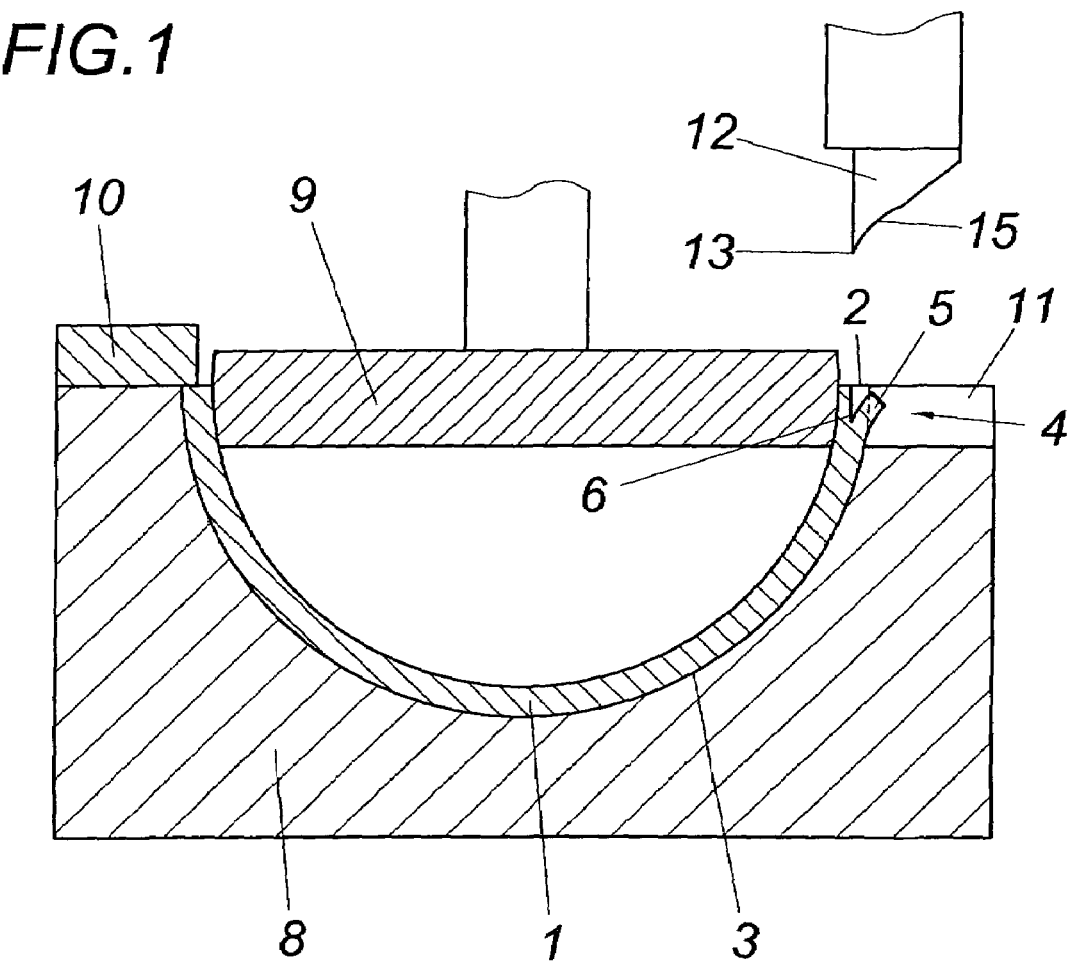
FIG. 1 shows a schematic sectional view perpendicular to the shell axis of a sliding bearing shell as inserted in a receiver and comprising a holding cam in accordance with the invention.
FIG. 2 shows a top view of the bearing shell according to FIG. 1 as inserted in the receiver.
Figure 3:
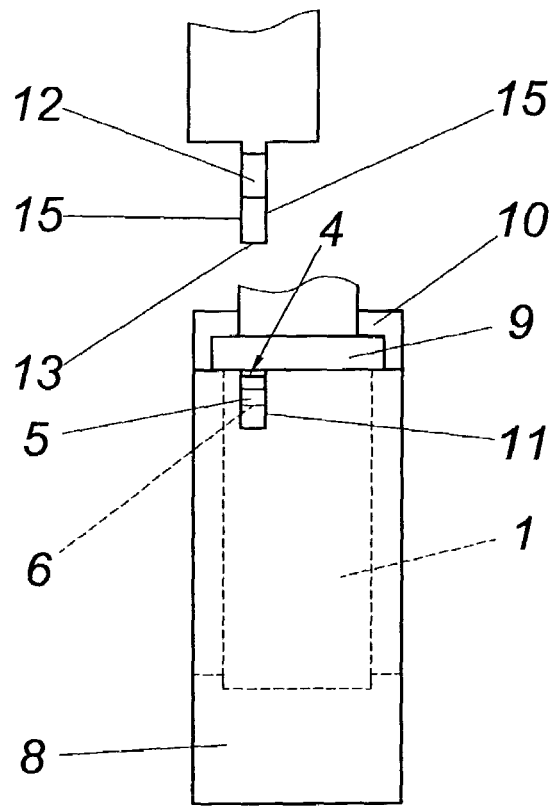
FIG. 3 shows a side view of the receiver with the inserted sliding bearing shell.

As is shown especially in FIG. 1, the sliding bearing shell 1 comprises in the region of its dividing surface 2 a holding cam 4 which projects radially from the shell back 3 and is formed by a tongue 5 which is cut out partly from the sliding bearing shell 1 by an indentation 6 and is bent out. The indentation 6 starting from the dividing surface 2 extends according to FIG. 1 substantially perpendicular to the dividing surface 2 and according to FIG. 2 parallel to the shell axis 7. The indentation is delimited on a first side by a shell body portion of the shell body and on a second side by the tongue the indentation having a width that narrows from a separation area, the width being measured along a line perpendicular to the shell body portion and from the shell body portion to a side of the tongue facing the shell body portion.

The sliding bearing shell 1 is clamped in a receiver 8 for producing the holding cam 4 in the form of a tongue 5 which is partly cut out and bent out of the sliding bearing shell 1, namely with the help of a plunger 9 which presses the sliding bearing 1 against the receiver 8 at least in the region of the dividing surface 2 and thus clamps the same appropriately in the region of the holding cam 4 to be formed. The sliding bearing shell 1 is held in the circumferential direction via a stop 10.

Figure 4:
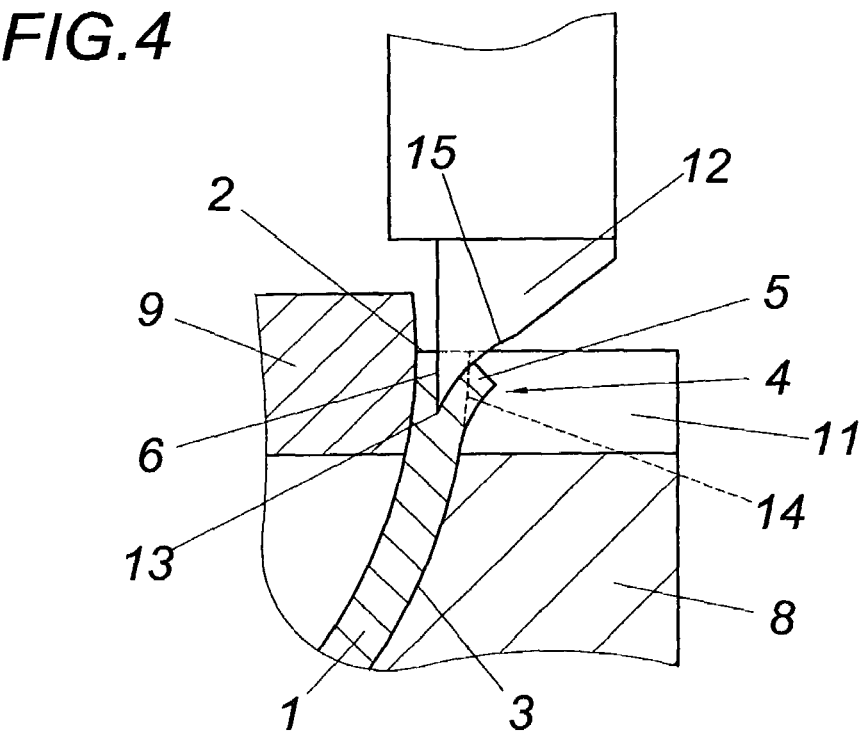
FIG. 4 shows the sliding bearing shell in sections in the region of the holding cam with a penetrating cleaving tool in sectional, axially normal view on an enlarged scale.

In the region of the holding cam 4 to be formed, the receiver is provided with a recess 11 adjusted to the tongue width in order to enable the bending out of the tongue 5 to be produced. A wedge-like cleaving tool 12 is used for partly cutting out this tongue 5, the blade 13 of which corresponds to the width of the tongue 5 to be cut out. As a result of the wedge-like shape of the cleaving tool 12, the tongue 5 is progressively cut out of the sliding bearing shell 1 during the penetration of the cleaving tool 12 into the dividing surface 2. It is simultaneously bent out, as is indicated in FIG. 4. Since the edges of the recess 11 of the receiver 8 which rest on the shell back 3 form bed knives 14 which cooperate with the cleaving tool 12, the regions of the lateral face surfaces of tongue 5 which project beyond the shell back 3 are cut simultaneously with the bending out of the tongue 5, so that the tongue width can be predetermined within a narrow tolerance region. In this connection it is necessary to consider that the lateral edges 15 of the cleaving tool 12 which start out from the blade 13 form cutting edges which support the lateral shearing off of the tongue 5.

The invention claimed is:

1. A sliding bearing shell comprising a shell body having a shell body thickness, a shell back portion, a separation area, and at least one holding cam arranged near the separation area and projecting radially from the shell back portion, said at least one holding cam forming a deformation section extending over only a part of the shell body thickness, wherein said deformation section comprises a tongue that is partly cut and bent out from the shell body at an angle forming an indentation starting from the separation area, the indentation being delimited on a first side by a shell body portion of the shell body and on a second side by the tongue, the indentation having a width that narrows from the separation area, the width being measured along a line perpendicular to the shell body portion and from the shell body portion to a side of the tongue facing the shell body portion.

\* \* \* \* \*

UNITED STATES PATENT AND TRADEMARK OFFICE
CERTIFICATE OF CORRECTION

PATENT NO.       : 7,618,190 B2
APPLICATION NO.  : 10/525650
DATED            : November 17, 2009
INVENTOR(S)      : Norbert Schrüfer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Nineteenth Day of October, 2010

David J. Kappos
*Director of the United States Patent and Trademark Office*